(12) United States Patent
Chang

(10) Patent No.: US 11,185,937 B2
(45) Date of Patent: Nov. 30, 2021

(54) DEVICE FOR LOCKING RIP FENCE OF TABLE SAW

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 47 days.

(21) Appl. No.: 16/708,890

(22) Filed: Dec. 10, 2019

(65) Prior Publication Data

US 2021/0170508 A1 Jun. 10, 2021

(51) Int. Cl.
*B23D 47/02* (2006.01)
*B27B 27/10* (2006.01)
*B27B 27/02* (2006.01)
*B23D 59/00* (2006.01)

(52) U.S. Cl.
CPC ............ *B23D 47/025* (2013.01); *B27B 27/02* (2013.01); *B27B 27/10* (2013.01); *Y10T 83/727* (2015.04); *Y10T 83/773* (2015.04)

(58) Field of Classification Search
CPC .... B23D 59/001; B23D 47/025; B27B 27/02; B27B 27/08; B27B 27/10; Y10T 83/737; Y10T 83/741; Y10T 83/773; Y10T 83/7647; Y10T 83/727
USPC .................................................. 83/438, 440
See application file for complete search history.

(56) References Cited

U.S. PATENT DOCUMENTS

| | | | | |
|---|---|---|---|---|
| 2,630,845 A * | 3/1953 | Eschennburg | ......... | B23Q 3/005 83/438 |
| 5,205,198 A * | 4/1993 | Foray | ..................... | B27B 25/10 144/253.1 |
| 5,293,802 A * | 3/1994 | Shiotani | ............... | B23D 47/025 269/318 |
| 6,578,461 B1 * | 6/2003 | Loo | ......................... | B23Q 5/34 144/245.6 |
| 10,183,415 B2 * | 1/2019 | Chang | ..................... | B27B 27/10 |
| 10,759,083 B1 * | 9/2020 | Chang | .................. | B23D 47/025 |
| 2008/0271664 A1 * | 11/2008 | Welsh | .................. | B23D 59/001 116/230 |
| 2009/0165624 A1 * | 7/2009 | Brown | .................... | B27B 27/02 83/477 |
| 2010/0116111 A1 * | 5/2010 | Rybka | ..................... | B27B 27/08 83/446 |
| 2010/0269657 A1 * | 10/2010 | Koegel | ................... | B27B 5/243 83/444 |
| 2016/0263672 A1 * | 9/2016 | Szweda | .................. | B23D 47/08 |
| 2018/0257255 A1 * | 9/2018 | Niichel | .................... | B27C 5/06 |
| 2019/0202080 A1 * | 7/2019 | Frolov | ................... | B27B 27/08 |

* cited by examiner

*Primary Examiner* — Laura M Lee

(57) ABSTRACT

A scale assembly of a table saw includes front and rear outer slide members at front and rear ends of a slide mechanism respectively; front and rear inner slide members at front and rear ends of a table assembly respectively in which the front inner slide member slides in the front outer slide member and the rear inner slide member slides in the rear outer slide member; a block member secured to a front end of a rip fence assembly and including a channel and a spring biased member; and a lever in the channel and including a trigger, a projection, and first and second recesses in which in a locked position, the spring biased member is biased by a spring to enter the first recess and the projection enters a lengthwise cavity on an outer surface of the front outer slide member.

4 Claims, 22 Drawing Sheets

DEVICE FOR LOCKING RIP FENCE OF TABLE SAW

BACKGROUND OF THE INVENTION

1. Field of the Invention

The invention relates to table saws and more particularly to a table saw including a spring biased device for locking a rip fence assembly of the table saw.

2. Description of Related Art

U.S. Pat. No. 10,183,415 to Chang, entitled "table saw", discloses a table saw comprising a table, a saw, a track, a slide strip, and a fence member. The table has an axial direction and a radial direction which are orthogonal to each other. The saw is arranged at a predetermined position of the table. The track is arranged at each side of the table. The slide strip is slidably engaged with the track. An outer surface of the slide strip opposite to the track has a first position part, a second position part, and a third position part. The first position part and the second position part are respectively arranged at two ends of the slide strip and the third position part is arranged at a center of the slide strip. The fence member is bridged on the table and secured to one of the first position part, the second position part, and the third position part.

Moreover, in the '415 patent in cutting the workpiece on the left of the saw of the table, the fence member is at the second position part. However, there is no scale for reference because there is no scale disposed in each of the track and the slide strip. In response to sliding the table to a position that the left side of the table is farther away from left sides of the slide assembly, on a front end of the table, two scales are disposed on a top of the track so that to the right the fence member is at the first position part and the third position part respectively. Thus, a user may use the scales as a reference in the cutting operation. Further, the user has to use another scale to measure width of the workpiece corresponding to the workpiece at the second position part. This is quite inconvenient.

Thus, the need for improvement still exists.

SUMMARY OF THE INVENTION

It is therefore one object of the invention to provide a table saw comprising a base assembly; a table assembly mounted on the base assembly and including a table and a table saw blade; a slide mechanism mounted on the table assembly; a rip fence assembly moveably disposed at one of three positions on both sides of the table assembly; front and rear outer slide members disposed at front and rear ends of the slide mechanism respectively; front and rear inner slide members disposed at front and rear ends of the table assembly respectively wherein the front inner slide member is configured to slide in the front outer slide member, and the rear inner slide member is configured to slide in the rear outer slide member; a block member secured to a front end of the rip fence assembly and including a channel, an internal receptacle, and a spring biased member disposed in the internal receptacle; and a lever pivotably, partially disposed in the channel and including a knurled trigger, a projection, a first recess, and a second recess adjacent to the first recess; wherein in a locked position, the spring biased member has one end entered the first recess and the projection enters a lengthwise cavity disposed on an outer surface of the front outer slide member; and wherein in an unlocked position, the spring biased member has one end entered the second recess and the projection clears the lengthwise cavity.

The above and other objects, features and advantages of the invention will become apparent from the following detailed description taken with the accompanying drawings.

DETAILED DESCRIPTION OF THE INVENTION

Figure 1:
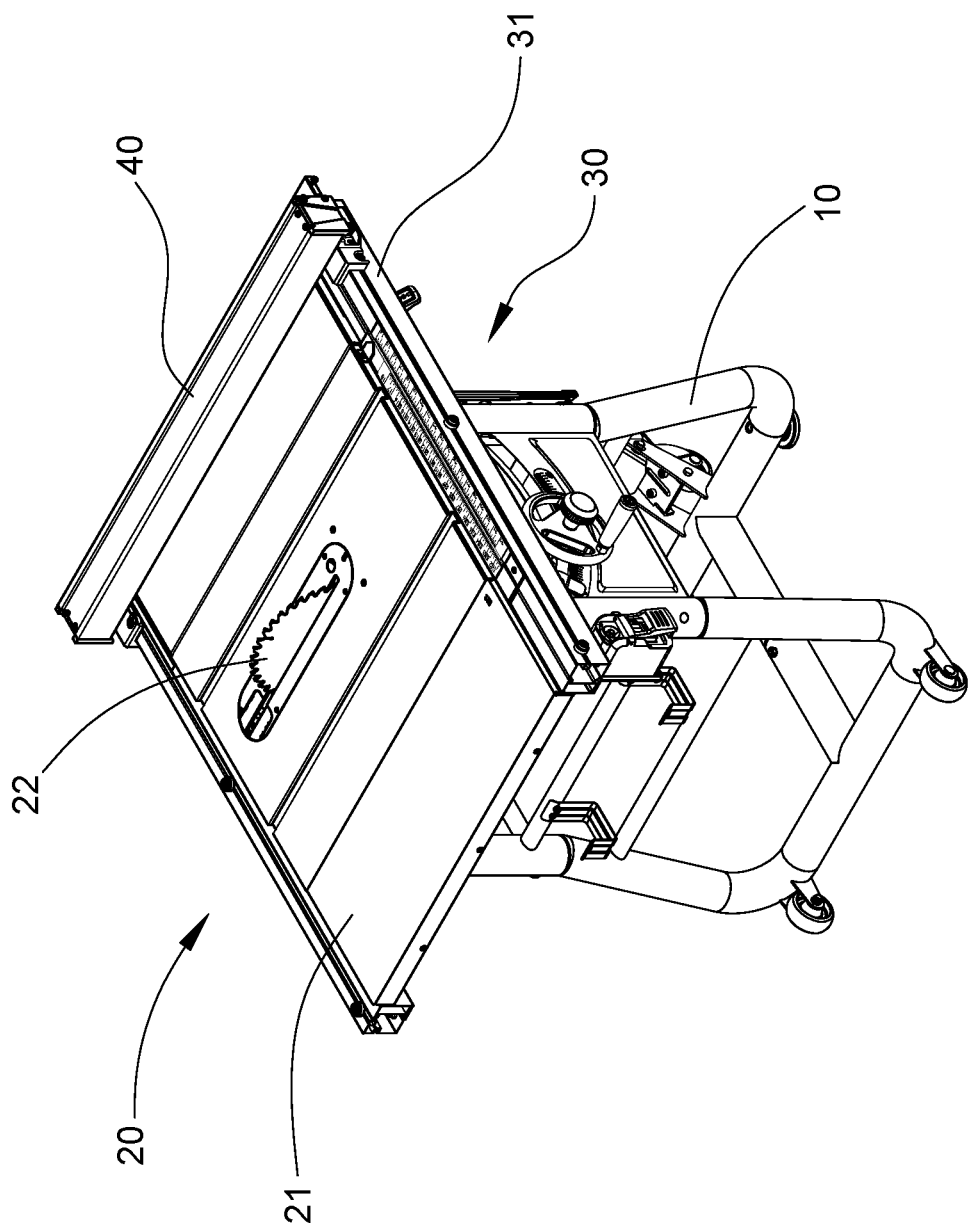
FIG. 1 is a perspective view of a table assembly and a base assembly of a table saw according to the invention.
Figure 2:
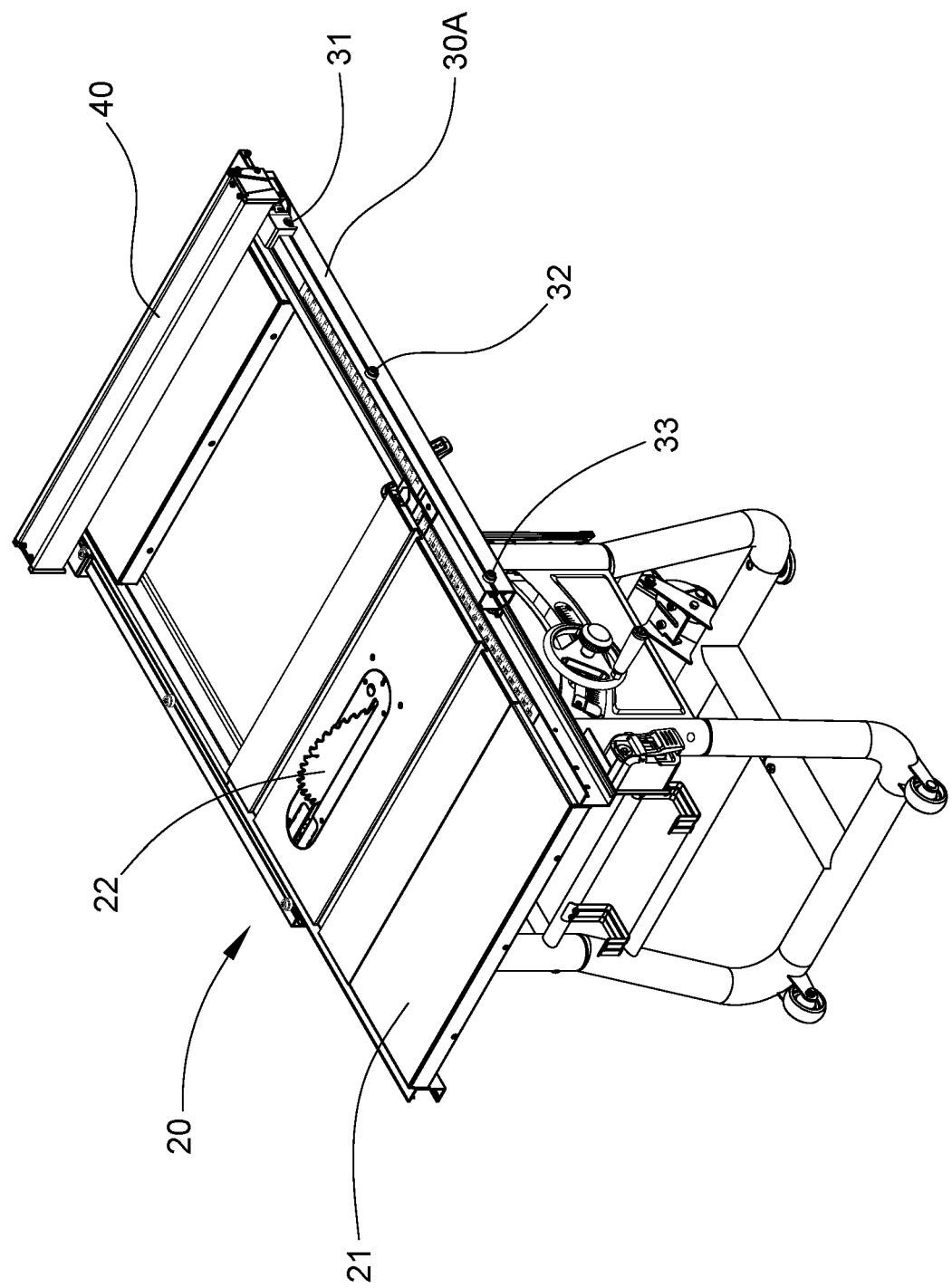
FIG. 2 is another perspective view of FIG. 1.
Figure 3:
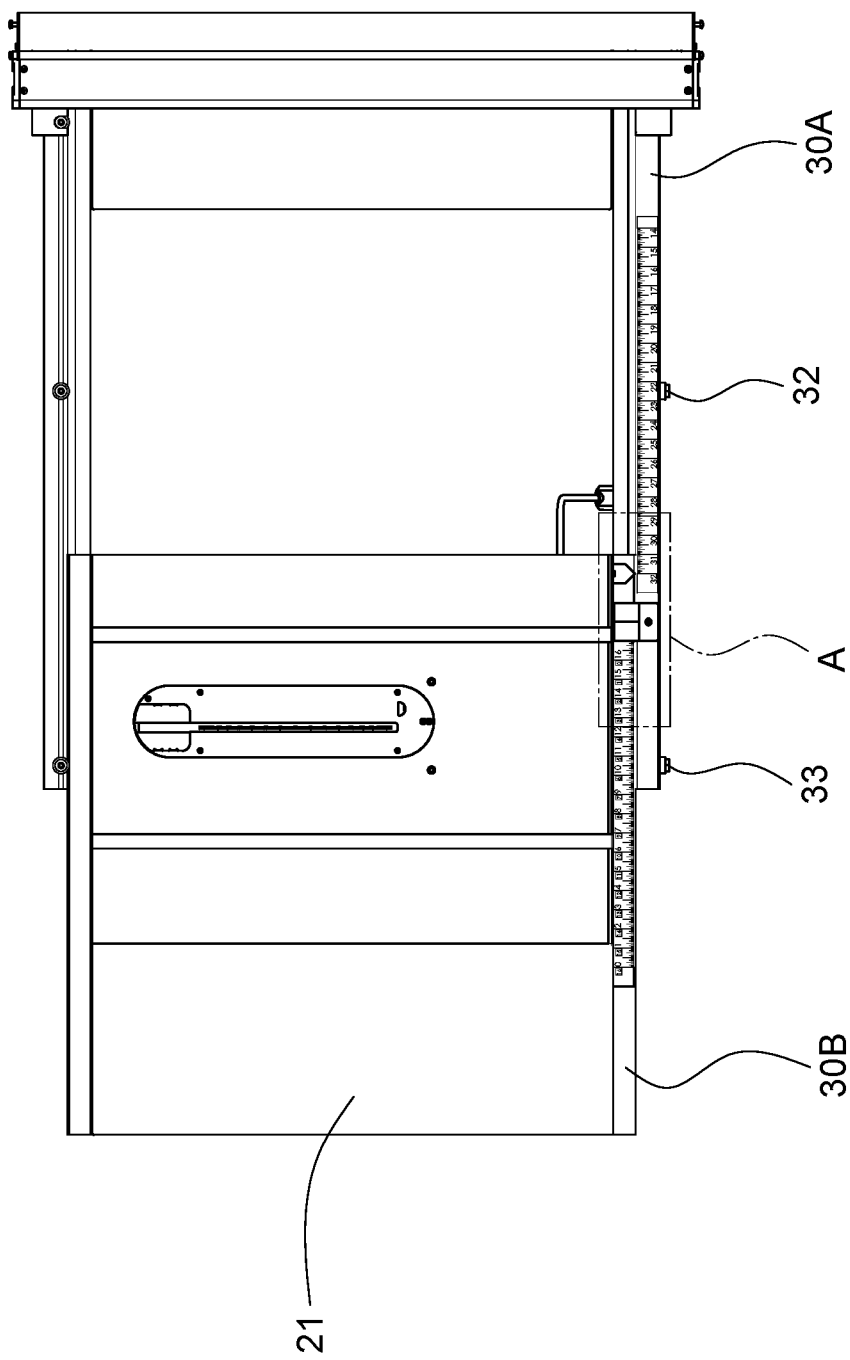
FIG. 3 is a top view of the table assembly.
Figure 4:
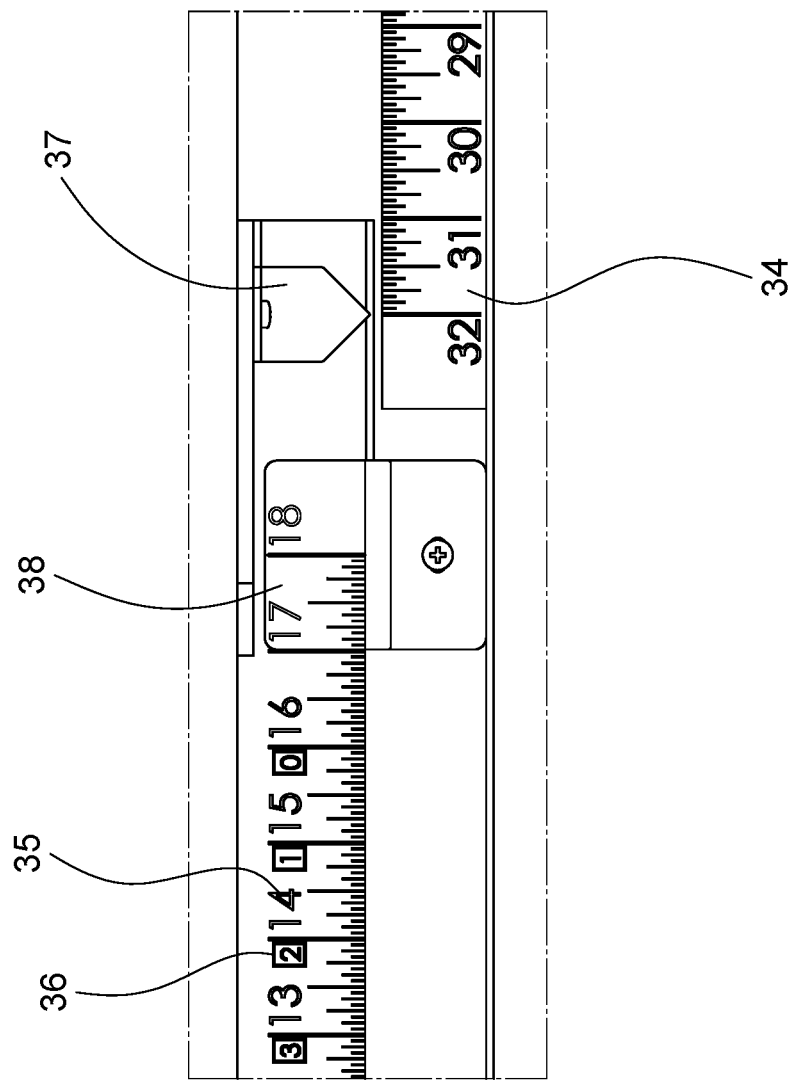
FIG. 4 is a detailed view of the area in a rectangle A of FIG. 3.
Figure 5:
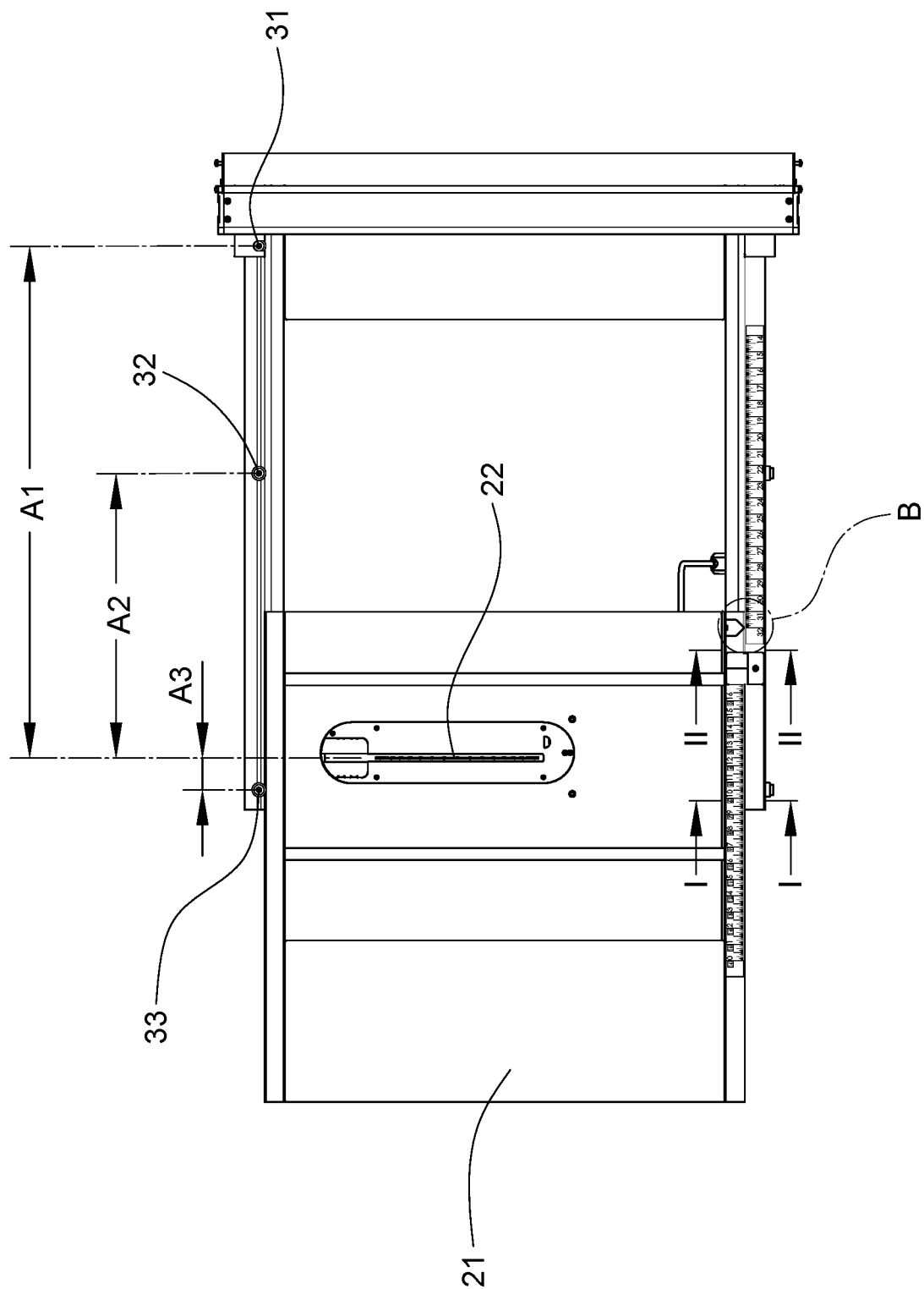
FIG. 5 is a view similar to FIG. 3.
Figure 6:
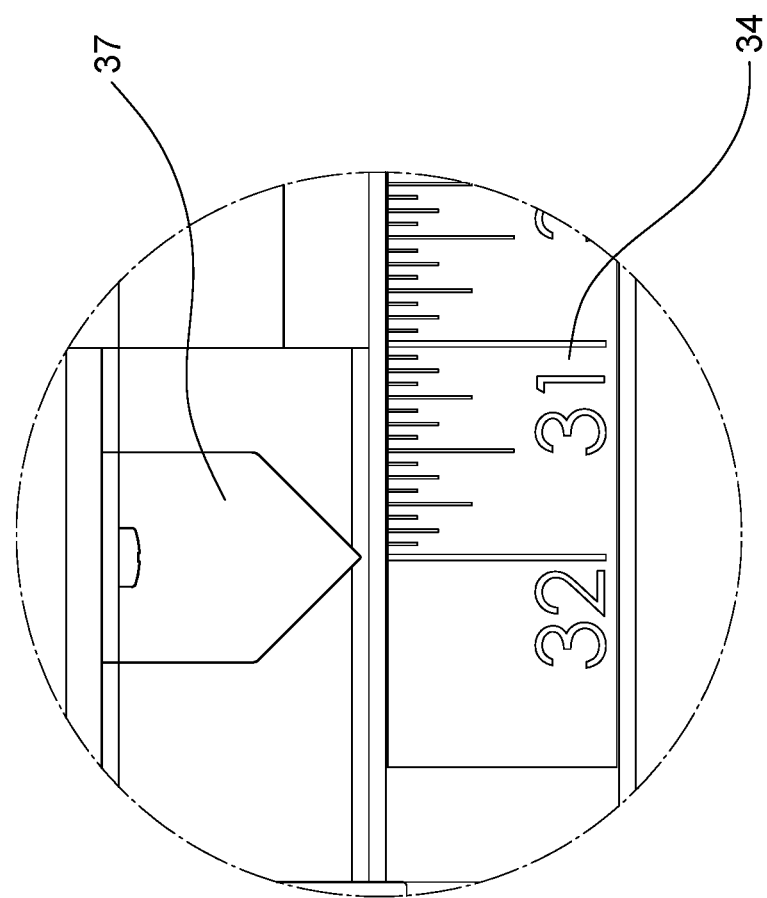
FIG. 6 is a detailed view of the area in a circle B of FIG. 5.
Figure 7:
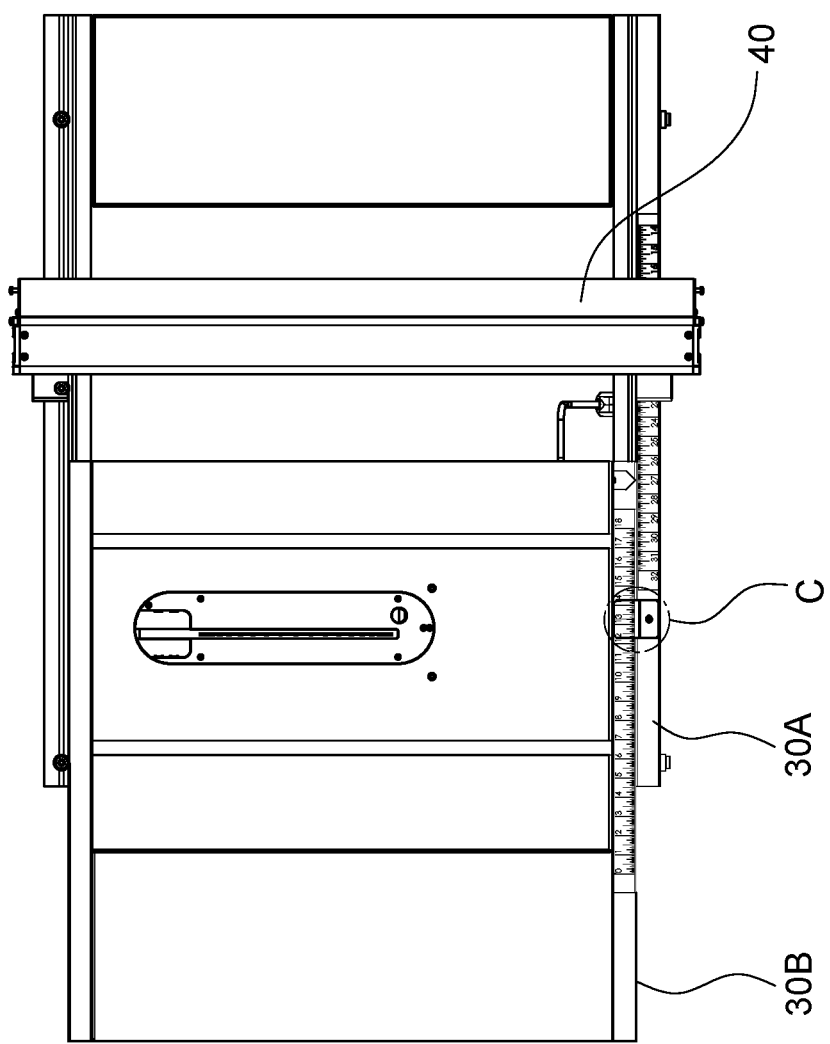
FIG. 7 is a view similar to FIG. 5 where the rip fence assembly has moved to an intermediate portion of the table.
Figure 8:
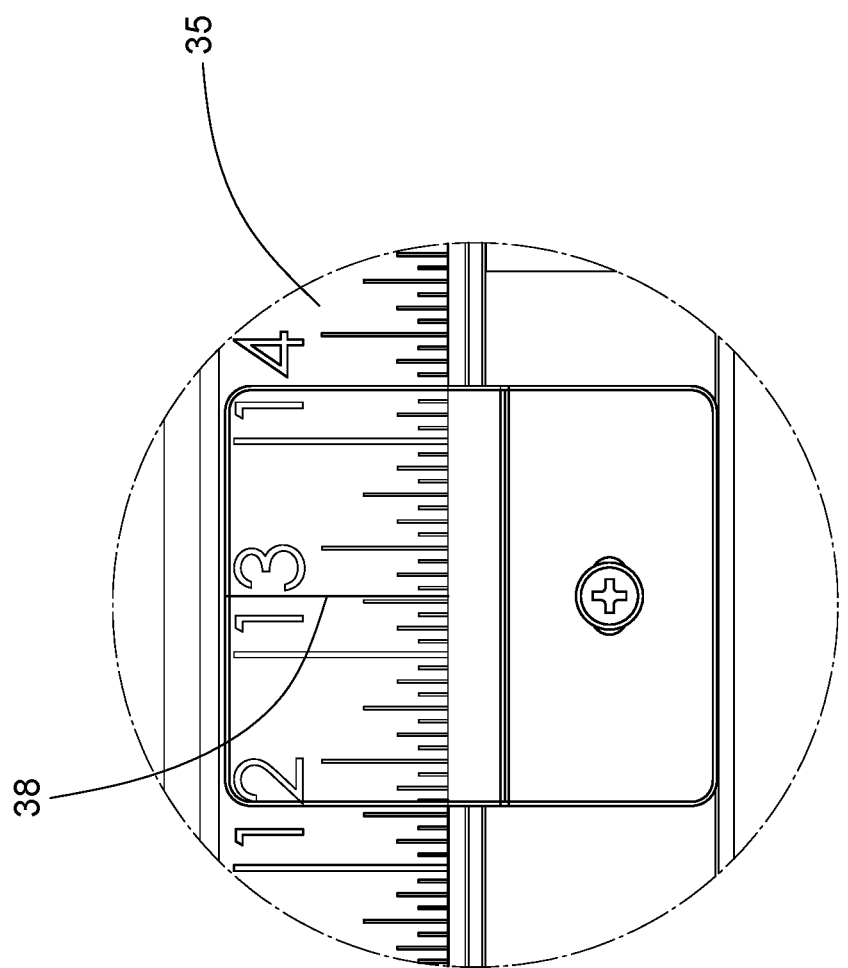
FIG. 8 is a detailed view of the area in a circle C of FIG. 7.
Figure 9:
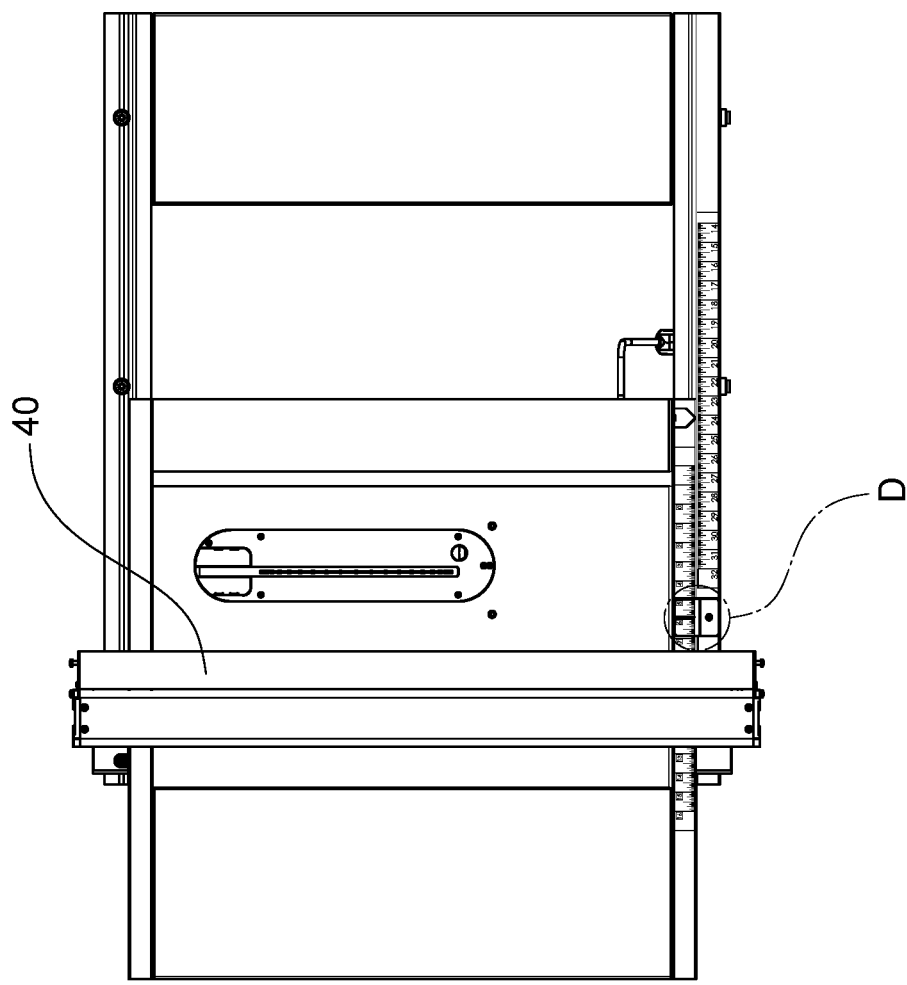
FIG. 9 is a view similar to FIG. 7 where the rip fence assembly has further moved to a left portion of the table.
Figure 10:
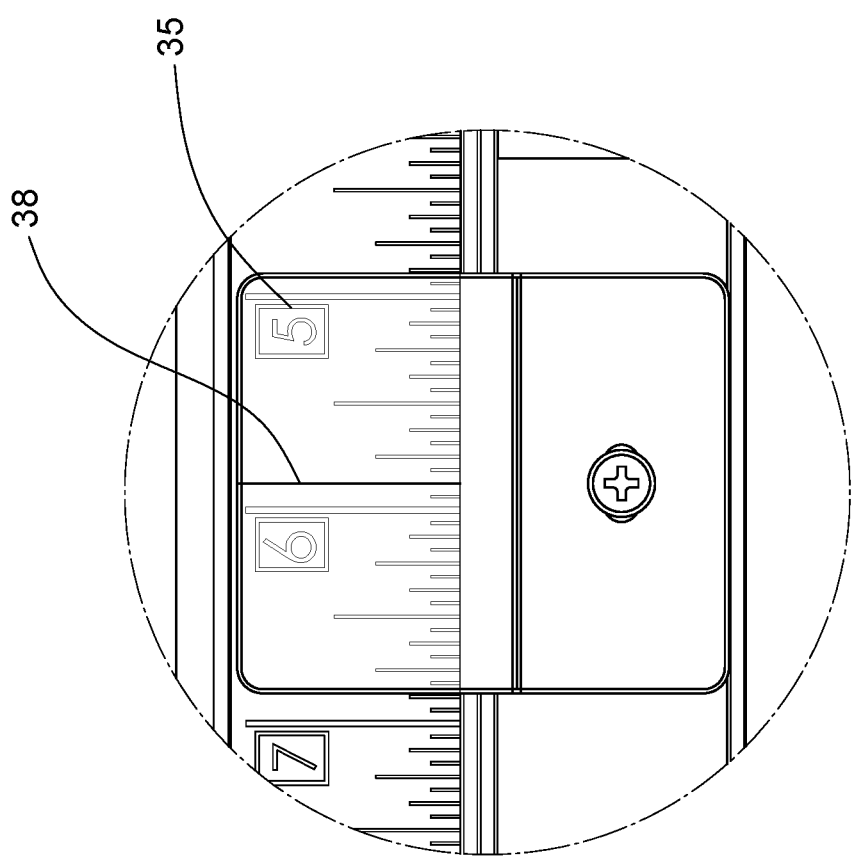
FIG. 10 is a detailed view of the area in a circle D of FIG. 9.
Figure 11:
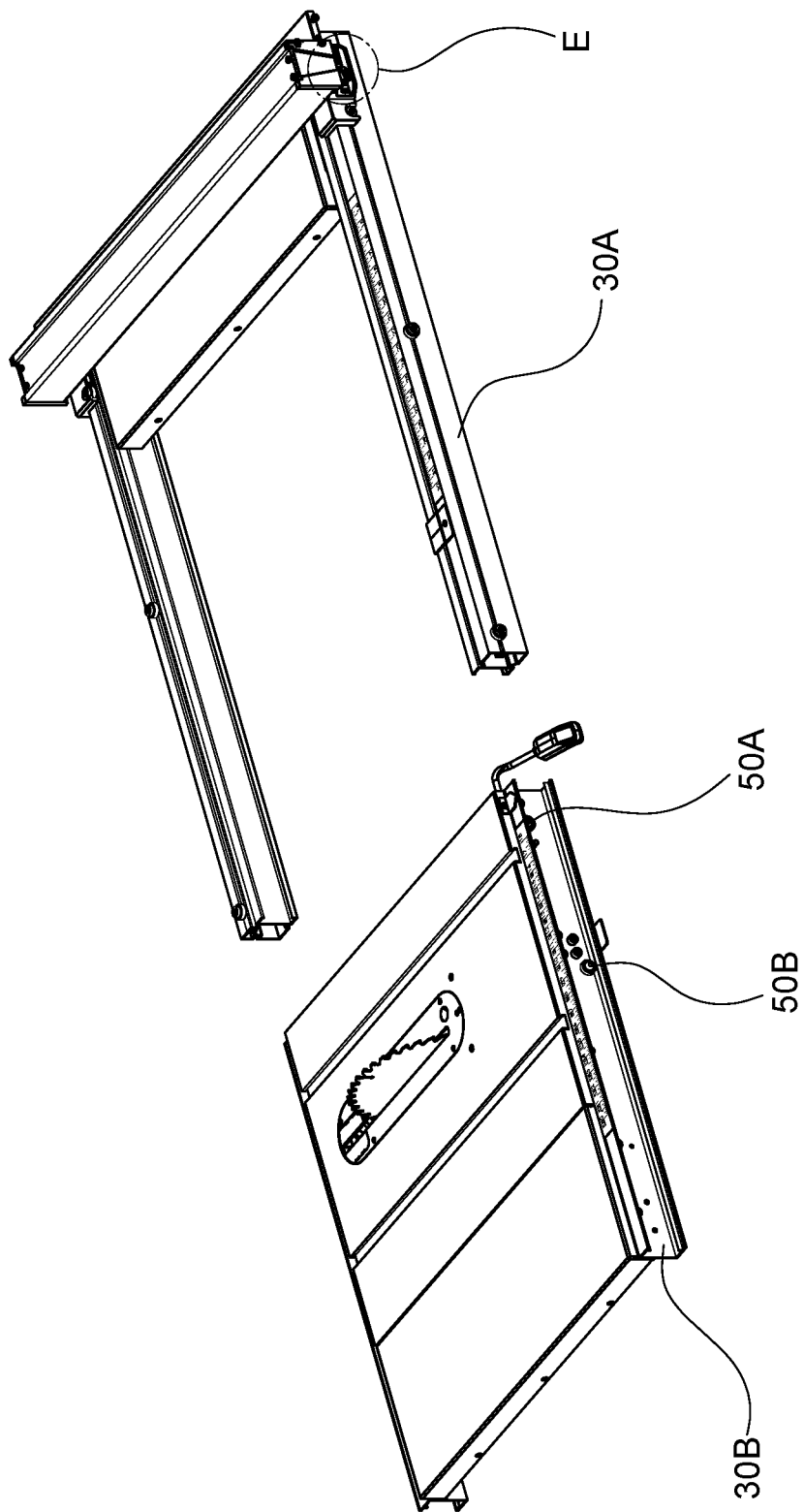
FIG. 11 is an exploded perspective view of the table assembly and the rip fence assembly.
Figure 11A:
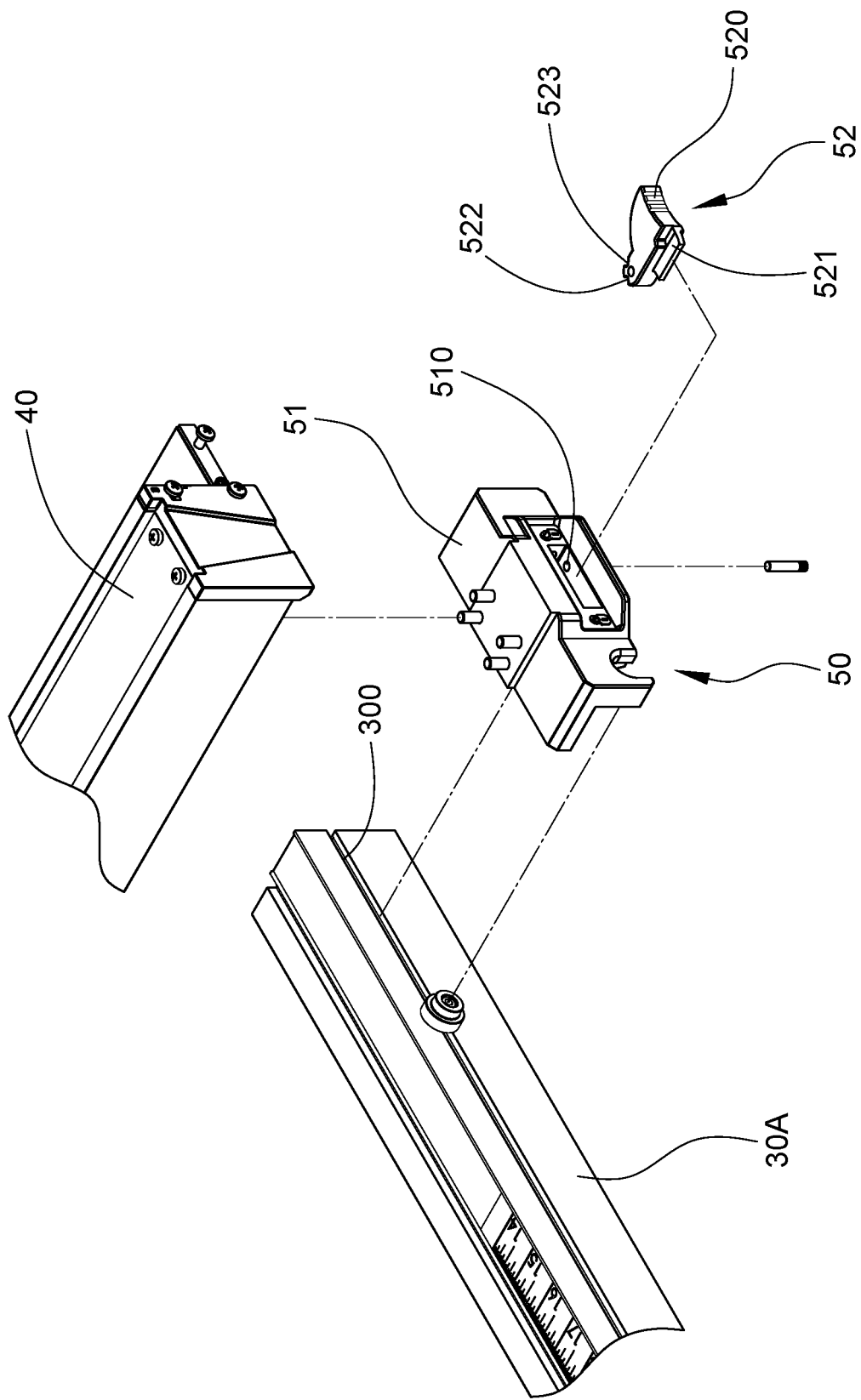
FIG. 11A is an exploded view of the rightmost portion of FIG. 11.

Referring to FIGS. 1 to 10, a table saw in accordance with the invention comprises a base assembly 10, a table assembly 20 mounted on the base assembly 10 and including a table 21 and a table saw blade 22, a slide mechanism 30 mounted on the table assembly 20, and a rip fence assembly 40 moveably disposed at one of three positions on both sides of the table assembly 20.

Two outer slide members 30A are disposed at front and rear ends of the slide mechanism 30 respectively and two inner slide members 30B are disposed at front and rear ends of the table assembly 20 respectively. A first positioning pin 31 of white, a second positioning pin 32 of black, and a third positioning pin 33 of yellow are disposed on the front outer slide member 30A. A first scale 34 of white is disposed on a top of the front outer slide member 30A. A second scale 35 of black and a third scale 36 of yellow are disposed on a top of the front inner slide member 30B respectively. A first pointer 37 is disposed on one end of the front outer table assembly 20 and points to the first scale 34 of white when the rip fence assembly 40 is at the first positioning pin 31 of white. A second pointer 38 is disposed on the other end of the top of the front outer slide member 30A and points to both the second scale 35 of black and the third scale 36 of yellow. Marks of the first scale 34 of white are gradually decreased from left to right in digits. When the rip fence assembly 40 is at the first positioning pin 31 of white, a user may see the first pointer 37 and the first scale 34 of white in a cutting operation so that it is possible of visually distinguishing the scales of different colors. Marks of the second scale 35 of black are gradually increased from left to right in digits. When the rip fence assembly 40 is at the second positioning pin 32 of black, the user may see the second pointer 38 and the second scale 35 of black in a cutting operation. Marks of the third scale 36 of yellow are gradually decreased from left to right in digits. When the rip fence assembly 40 is at the third positioning pin 33 of yellow, the user may see the second pointer 38 and the third scale 36 of yellow in a cutting operation. A1 is defined as a distance between the first positioning pin 31 of white and the table saw blade 22 in a cutting operation. A2 is defined as a distance between the second positioning pin 32 of black and the table saw blade 22 in a cutting operation. A3 is defined as a distance between the third positioning pin 33 of yellow and the table saw blade 22 in a cutting operation. After positioning a workpiece (not shown) on the table 21, a user may slide the table 21 relative to the outer slide members 30A to measure a width of the workpiece and align the corresponding first pointer 37 or the second pointer 38 with the edge of the workpiece.

Referring to FIGS. 11 to 21 in conjunction with FIGS. 1 to 10, a device 50 for locking the rip fence assembly 40 as the subject of the invention is discussed in detail below.

Two upper bearings 50A are provided on upper portions of the inner slide members 30B respectively. Two lower bearings 50B are provided on lower portions of the inner slide members 30B respectively. The provision of both the upper bearings 50A and the lower bearings 50B can prevent the outer slide members 30A from being bent due to extension.

The lock device 50 comprises a block member 51 secured to a front end of the rip fence assembly 40 and including an intermediate channel 510, an internal receptacle 511, a helical spring 512 in the receptacle 511, and a steel ball 513 on an open end of the spring 512; and a lever 52 pivotably, partially disposed in the channel 510 and including a knurled trigger 520 on a first surface, a projection 521 on a second surface adjacent to the first surface, a first recess 522 on a third surface between the first and second surface, and a second recess 523 adjacent to the first recess 522.

Figure 12:
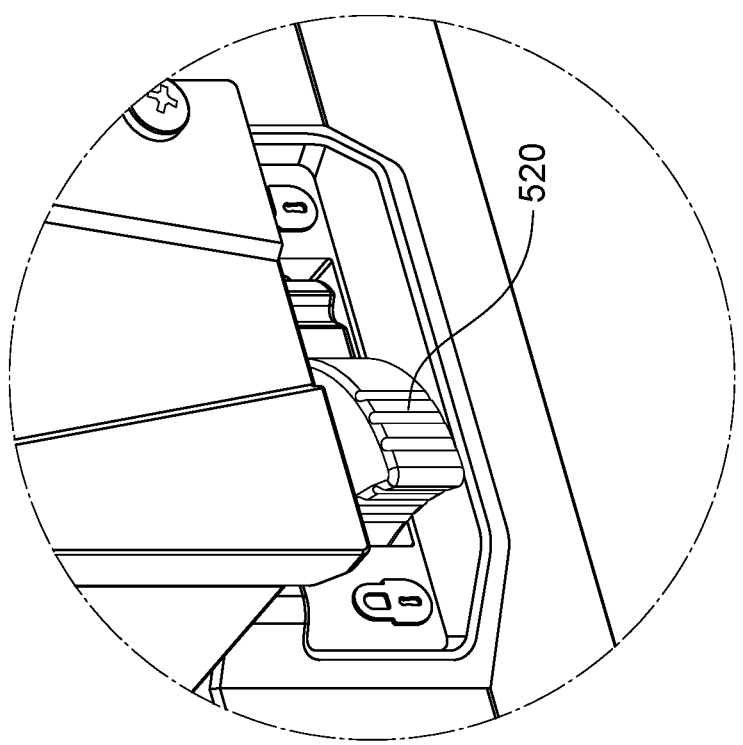
FIG. 12 is a detailed view of the area in a circle E of FIG. 11.
Figure 13:
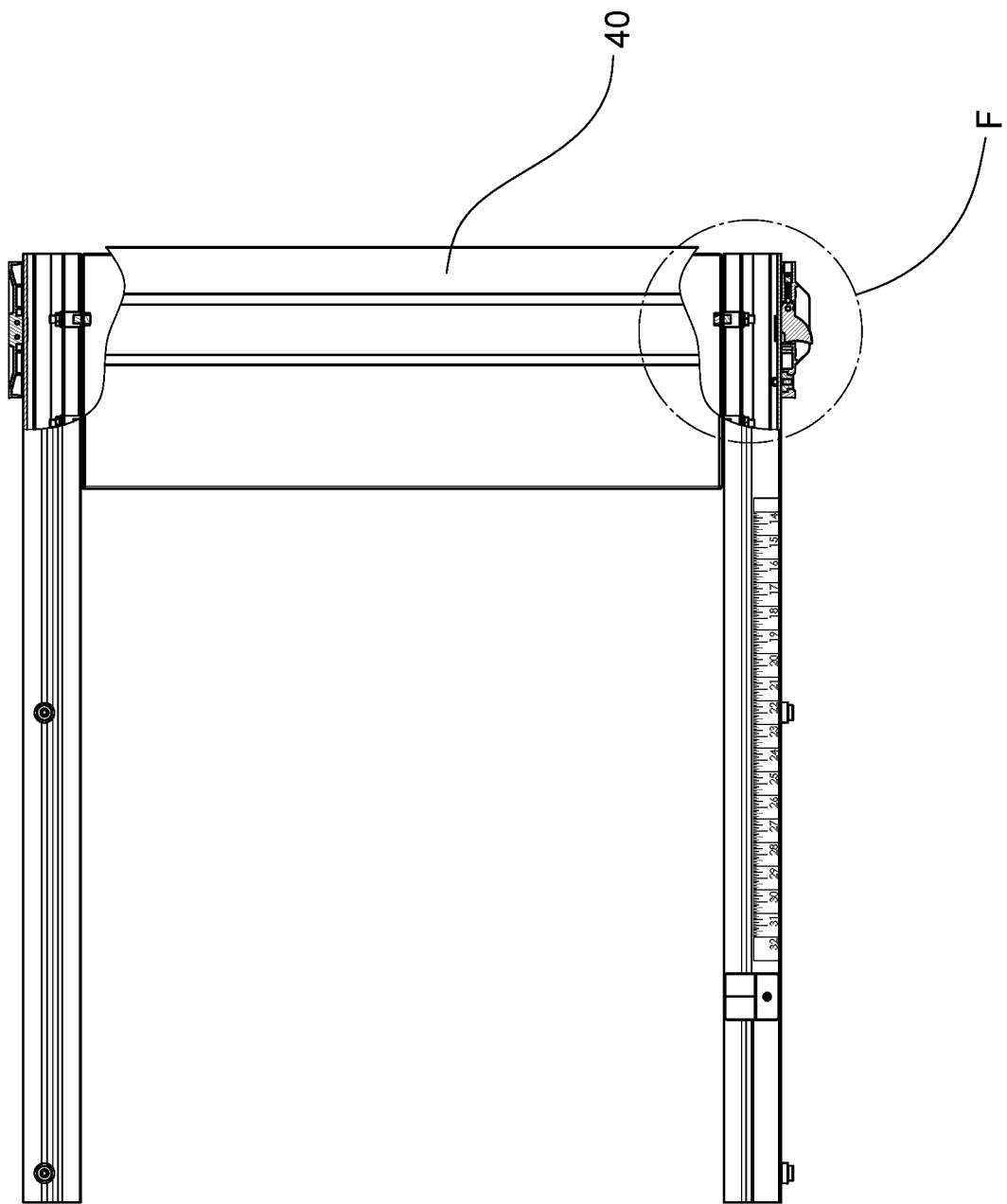
FIG. 13 is a top plan view of the rip fence assembly and the slide mechanism.
Figure 14:
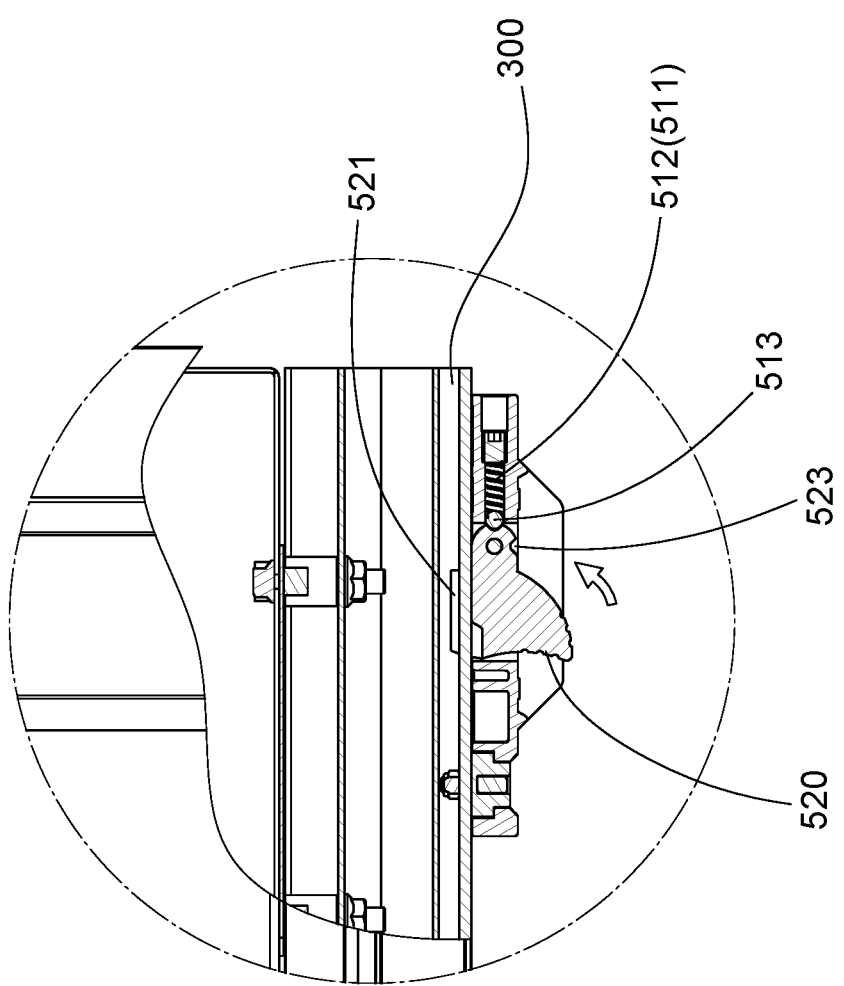
FIG. 14 is a detailed view of the area in a circle F of FIG. 13.
Figure 15:
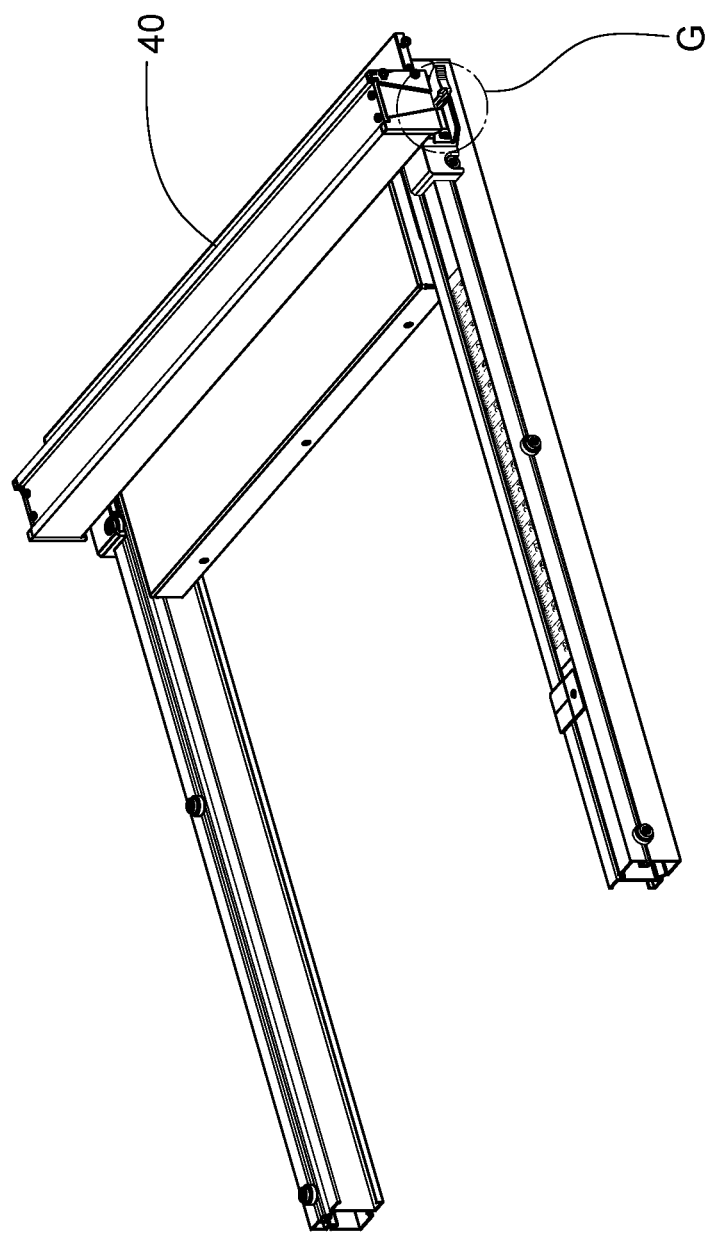
FIG. 15 is a perspective view of the rip fence assembly and the slide mechanism.
Figure 16:
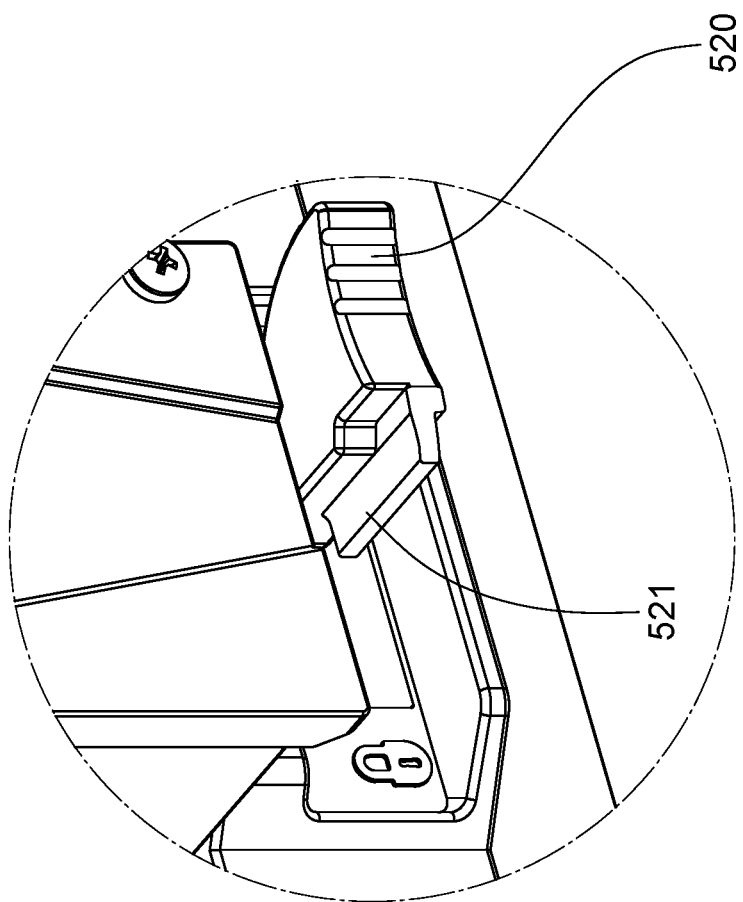
FIG. 16 is a detailed view of the area in a circle G of FIG. 15.
Figure 17:
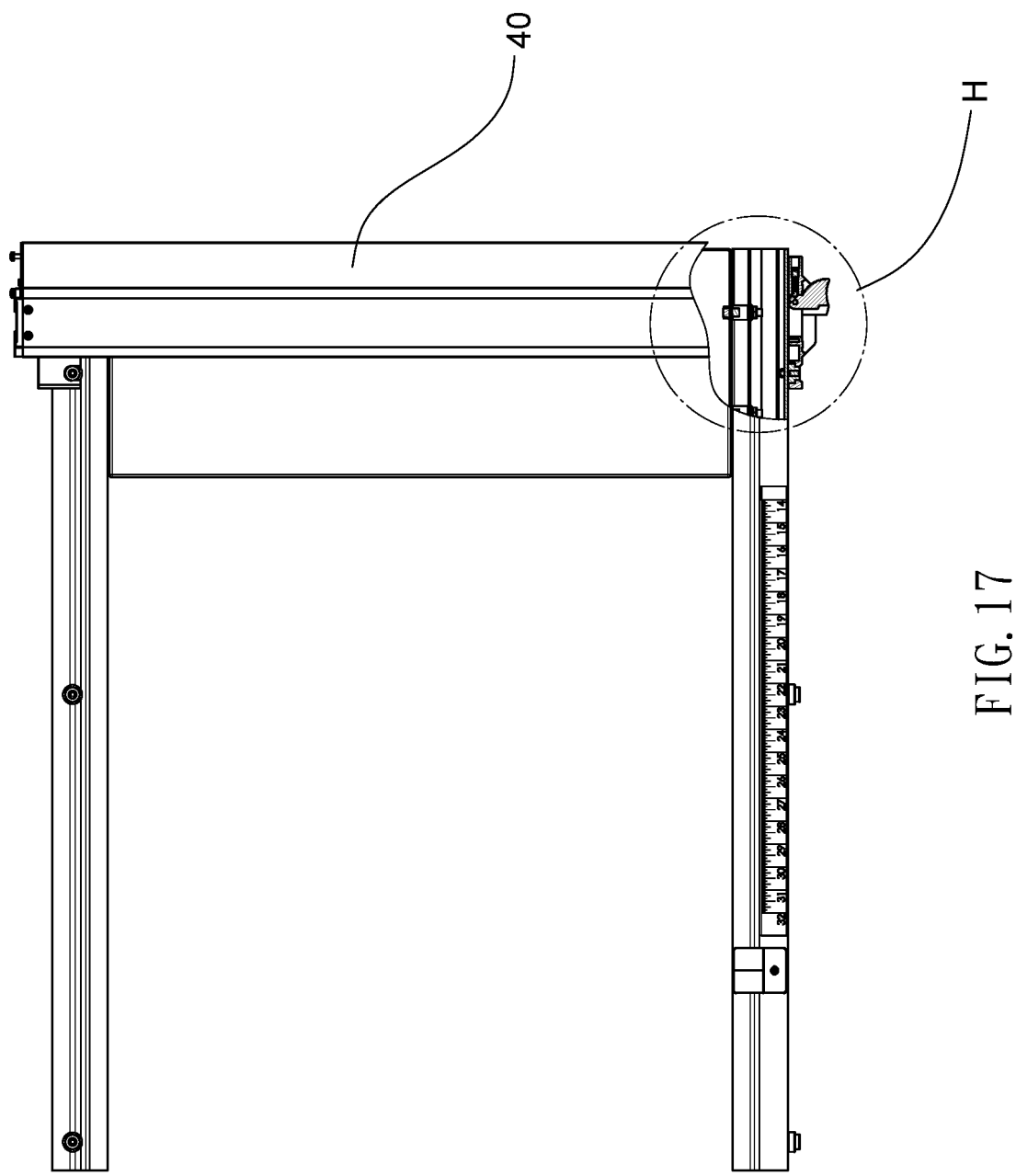
FIG. 17 is a view similar to FIG. 13.
Figure 18:
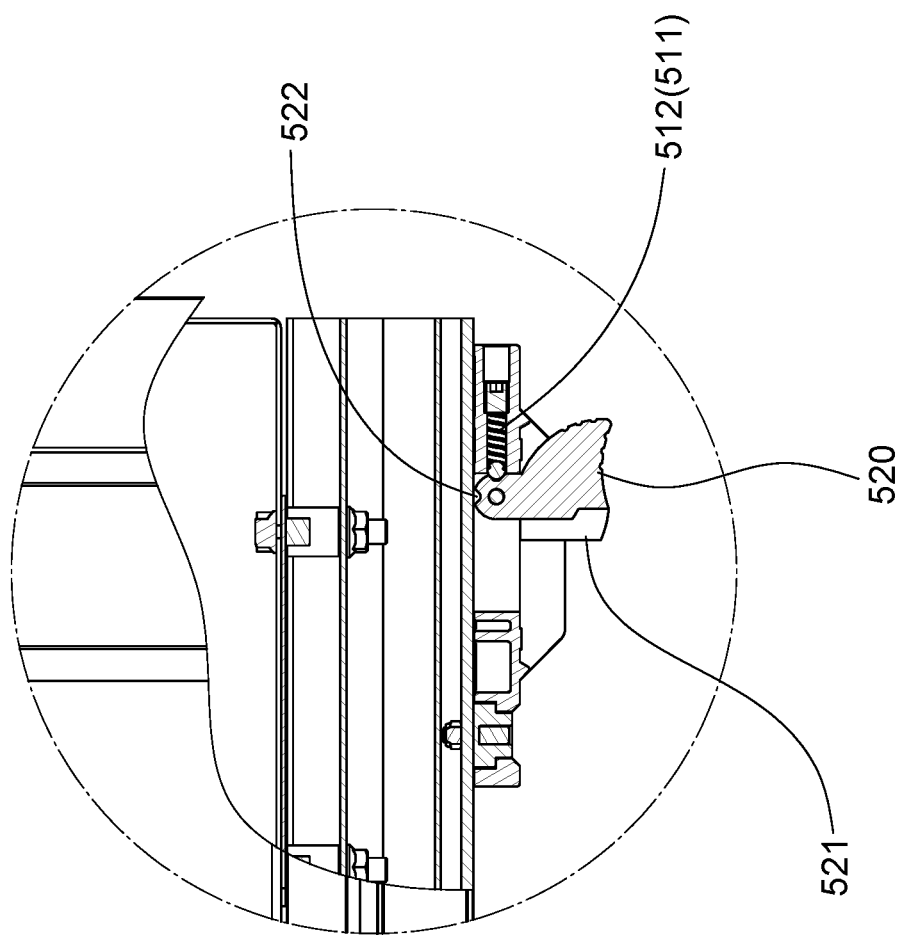
FIG. 18 is a detailed view of the area in a circle H of FIG. 17.
Figure 19:
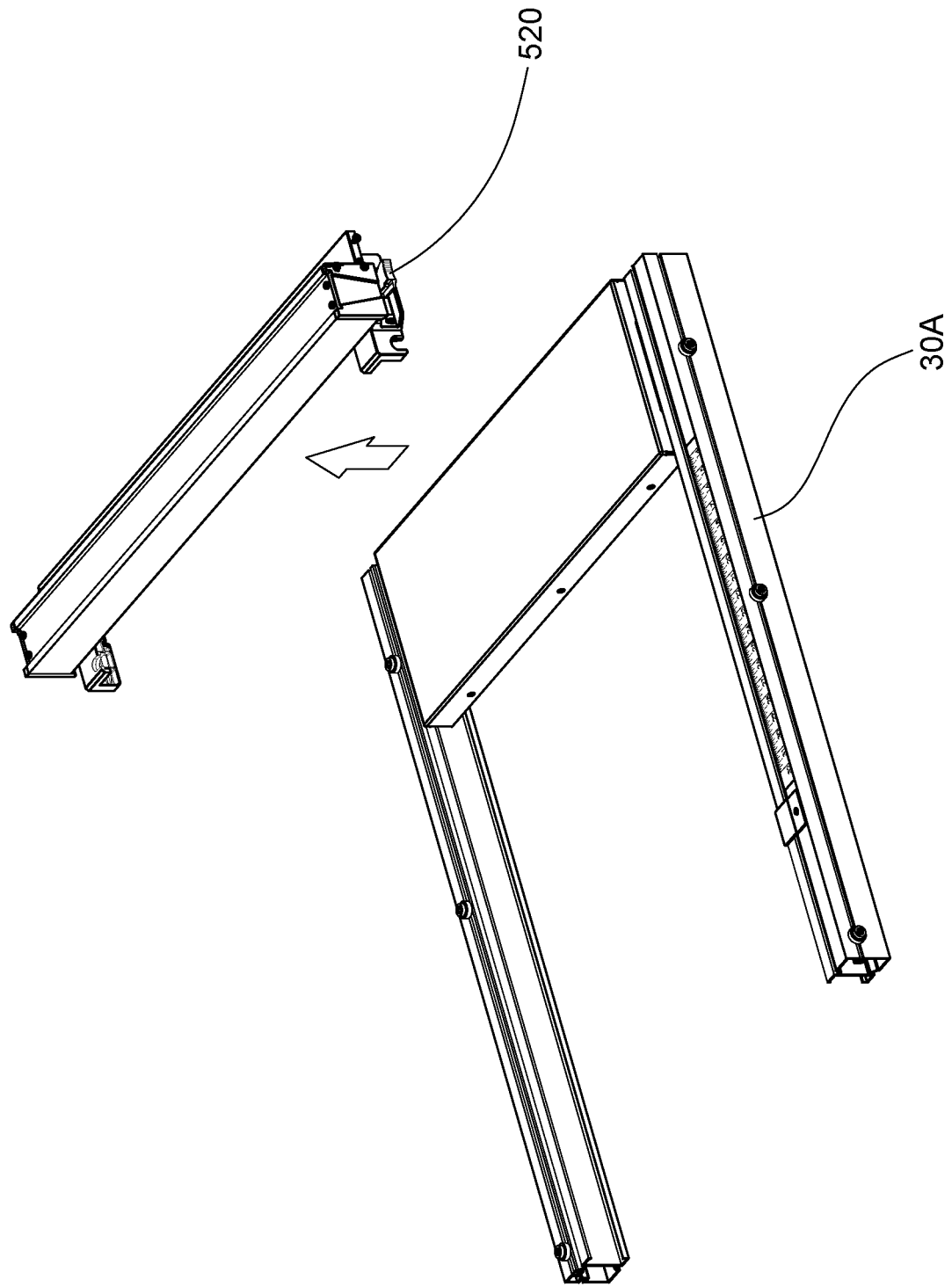
FIG. 19 is an exploded perspective view of the rip fence assembly and the slide mechanism.
Figure 20:
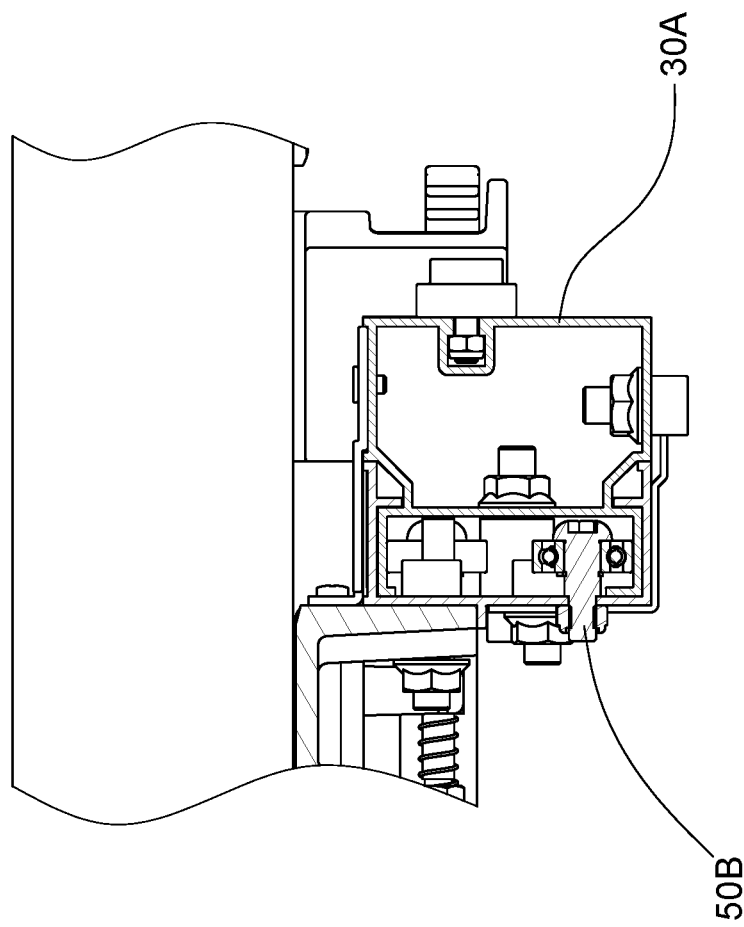
FIG. 20 is a sectional view taken along line I-I of FIG. 5.
Figure 21:
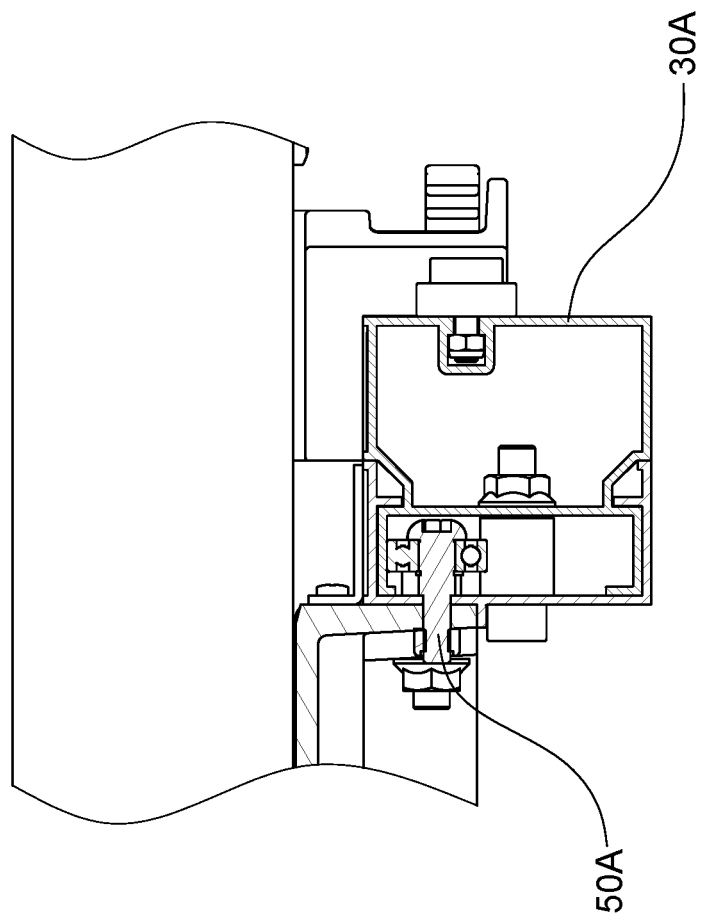
FIG. 21 is a sectional view taken along line II-II of FIG. 5.

As shown in FIGS. 12, 13 and 14 specifically, the steel ball 513 is urged by the spring 512 to enter the first recess 522, and the projection 521 enters a lengthwise cavity 300 which is formed on an outer surface of the front outer slide member 30A. As a result, the rip fence assembly 40 is locked.

As shown in FIGS. 15 to 19 specifically, an individual may press the trigger 520 to counterclockwise rotate the lever 52 to cause the steel ball 513 to clear the first recess 522. After the steel ball 513 has ridden over a ridge between the first recess 522 and the second recess 523, the spring 512 pushes the steel ball 513 to enter the second recess 523 and the projection 521 clears the lengthwise cavity 300. As a result, the rip fence assembly 40 is unlocked. Further, the rip fence assembly 40 and the slide mechanism 30 can be separated (see FIG. 19).

While the invention has been described in terms of preferred embodiments, those skilled in the art will recognize that the invention can be practiced with modifications within the spirit and scope of the appended claims.

What is claimed is:

1. A table saw, comprising:
    a base assembly;
    a table assembly mounted on the base assembly and including a table and a table saw blade;
    a slide mechanism mounted on the table assembly;
    a rip fence assembly being movable and having a first end and a second end wherein the first end of the rip fence assembly is at a first position of a first side of the table assembly and the second end of the rip fence assembly is at a first position of a second side of the table assembly opposite to the first position of the first side of the table assembly, the first end of the rip fence assembly is at a second position of the first side of the table assembly and the second end of the rip fence assembly is at a second position of the second side of the table assembly opposite to the second position of the first side of the table assembly, or the first end of the rip fence assembly is at a third position of the first side of the table assembly and the second end of the rip fence assembly is at a third position of the second side of the table assembly opposite to the third position of the first side of the table assembly;
    front and rear outer slide members disposed at front and rear ends of the slide mechanism respectively;
    front and rear inner slide members disposed at front and rear ends of the table assembly respectively wherein the front inner slide member is configured to slide in the front outer slide member, and the rear inner slide member is configured to slide in the rear outer slide member;
    a block member secured to a front end of the rip fence assembly and including a channel, an internal receptacle, a spring in the internal receptacle, and a spring biased member biased by the spring; and
    a lever partially disposed in the channel and including a knurled trigger, a projection, a first recess, and a second recess adjacent to the first recess;
    wherein in a locked position, the spring biased member enters the first recess and the projection enters a lengthwise cavity disposed on an outer surface of the front outer slide member to lock the rip fence assembly; and
    wherein in an unlocked position, the spring biased member enters the second recess and the projection clears the lengthwise cavity to unlock the rip fence assembly.

2. The table saw of claim 1, wherein the spring biased member is a steel ball.

3. The table saw of claim 2, wherein in response to pressing the trigger, the lever counterclockwise rotates to cause the steel ball to clear the first recess, and after the steel ball has ridden over a ridge between the first recess and the second recess, the spring pushes the steel ball to enter the second recess and the projection clears the lengthwise cavity.

4. The table saw of claim 1, further comprising two upper bearings provided on upper portions of the inner slide members respectively, and two lower bearings provided on lower portions of the inner slide members respectively such that both the upper bearings and the lower bearings prevent the outer slide members from being bent due to extension.

* * * * *